(12) United States Patent
Reisner (10) Patent No.: US 9,197,944 B2
(45) Date of Patent: Nov. 24, 2015

(54) SYSTEMS AND METHODS FOR HIGH AVAILABILITY HTTP STREAMING

(75) Inventor: Samuel J. Reisner, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 534 days.

(21) Appl. No.: 13/592,837

(22) Filed: Aug. 23, 2012

(65) Prior Publication Data

US 2014/0059243 A1 Feb. 27, 2014

(51) Int. Cl.
| | |
|---|---|
| *G06F 15/16* | (2006.01) |
| *H04N 21/643* | (2011.01) |
| *H04N 21/2343* | (2011.01) |
| *H04N 21/84* | (2011.01) |
| *H04N 21/845* | (2011.01) |
| *H04W 36/00* | (2009.01) |
| *H04L 29/06* | (2006.01) |
| *H04L 12/24* | (2006.01) |

(52) U.S. Cl.
CPC ........ *H04N 21/64322* (2013.01); *H04L 65/607* (2013.01); *H04N 21/23439* (2013.01); *H04N 21/84* (2013.01); *H04N 21/8456* (2013.01); *H04L 41/06* (2013.01); *H04L 65/4084* (2013.01); *H04L 65/601* (2013.01); *H04W 36/0011* (2013.01)

(58) Field of Classification Search
CPC .................. H04N 21/64322; H04N 21/23439; H04N 21/84; H04N 21/8456; H04L 65/607; H04L 65/4084; H04L 65/601; H04L 41/06; H04W 36/0011
USPC ......................................... 709/219, 223, 231
See application file for complete search history.

(56) References Cited

U.S. PATENT DOCUMENTS

| 8,185,612 | B1 * | 5/2012 | Arolovitch et al. ........... 709/219 |
|---|---|---|---|
| 8,341,255 | B2 * | 12/2012 | Gopalakrishnan ............ 709/223 |
| 8,683,013 | B2 * | 3/2014 | Major et al. .................. 709/219 |
| 8,751,679 | B2 * | 6/2014 | McHugh et al. .............. 709/231 |
| 8,806,193 | B2 * | 8/2014 | Swaminathan et al. ....... 713/155 |
| 8,948,249 | B2 * | 2/2015 | Sun et al. ................. 375/240.01 |
| 2010/0268836 | A1 * | 10/2010 | Jabri et al. ................... 709/231 |
| 2011/0087794 | A1 * | 4/2011 | Li et al. ........................ 709/231 |
| 2012/0011270 | A1 * | 1/2012 | Priddle et al. ................ 709/231 |
| 2012/0042091 | A1 * | 2/2012 | McCarthy et al. ............ 709/231 |
| 2012/0117201 | A1 * | 5/2012 | Arolovitch et al. ........... 709/219 |
| 2012/0233228 | A1 * | 9/2012 | Barton et al. ................. 707/827 |
| 2012/0233522 | A1 * | 9/2012 | Barton et al. ................. 714/758 |

(Continued)

*Primary Examiner* — Viet Vu
*Assistant Examiner* — Michael A Chambers
(74) *Attorney, Agent, or Firm* — Buckley Maschoff & Talwalkar LLC (57) ABSTRACT

According to some embodiments, systems, methods, apparatus, and computer program code are provided to process video source data to generate a high availability segmented video stream for delivery to client devices. Pursuant to some embodiments, the video source data is packaged into a first segmented video stream and a second segmented video stream, and a first stream manifest file for the first segmented video stream and a second stream manifest file for the second segmented video stream are generated. A high availability stream manifest file is generated based on the first stream manifest file, the second stream manifest file and information associated with the availability of individual segments of the first and second segmented video streams. The segmented video stream data is then provided via the high availability stream manifest file to one or more client devices over one or more network connections.

20 Claims, 7 Drawing Sheets

(56) References Cited

U.S. PATENT DOCUMENTS

2012/0265856 A1* 10/2012 Major et al. .................. 709/219
2012/0284802 A1* 11/2012 Hierro et al. .................... 726/27
2013/0091249 A1*  4/2013 McHugh et al. ............. 709/219
2013/0142055 A1*  6/2013 Bao et al. ...................... 370/252
2013/0163758 A1*  6/2013 Swaminathan et al. ...... 380/259
2013/0166906 A1*  6/2013 Swaminathan et al. ...... 713/155
2014/0198641 A1*  7/2014 Perkuhn et al. ............... 370/230

* cited by examiner

SYSTEMS AND METHODS FOR HIGH AVAILABILITY HTTP STREAMING

FIELD

The present invention relates to systems and methods for streaming data such as video and audio to client devices. Some embodiments relate to systems and methods to increase the availability and reliability of such video and audio streams when delivered over Hypertext Transfer (or Transport) Protocol ("HTTP") connections.

BACKGROUND

An increasing number of live and recorded video and audio programs are being delivered to users via the Internet. Thanks to advances in bandwidth availability, media compression and computing power, more and more users enjoy programs delivered to their mobile and other computing devices. Rather than downloading entire programs for viewing, it is becoming increasingly common to "stream" programs to users by transmitting video or audio data to user devices in a steady, continuous stream. A number of streaming protocols are commonly used, including HTTP Live Streaming promoted by Apple® and Smooth Streaming promoted by Microsoft®. These streaming protocols define how, for example, a stream including video, audio, and possibly other ancillary data (e.g. cue points, time code, and closed captioning) is to be packaged or segmented for distribution to client devices.

Figure 2:
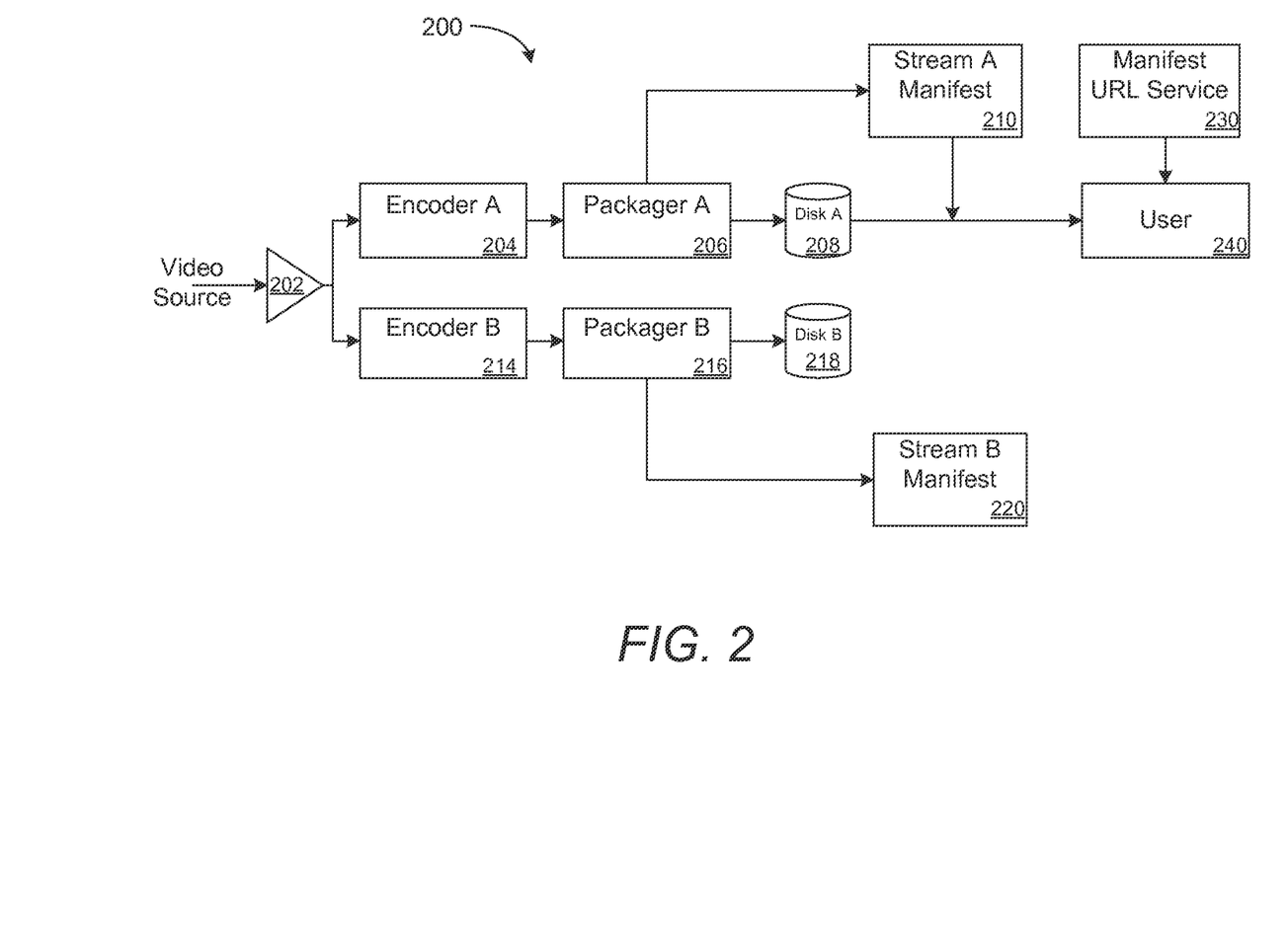
FIG. 2 is an illustration of a video streaming system using an existing method of failover.

An example of a conventional processing system configured according to certain existing approaches is shown in FIG. 2. This system provides a single manifest URL service 230 accessed by a user (e.g., operating a client device 240) and is subject to system failure. For example, on stream failure (of stream A of FIG. 2, for example) the user would see the stream stop mid-program. An administrator of the system may manually update the file uniform resource identifier (URI) in the manifest URL service 230, or the URI may be automatically updated by a watchdog process at which point the client device 240 may reinitialize the stream with the new URI. As shown in FIG. 2, previous approaches use a separate manifest file for each distribution chain. As can be seen from FIG. 2, when distributing a segmented HTTP stream, if there is an encoder, segmenter, or origin failure, the distribution stream will be interrupted. It would be desirable to reduce the interruptions associated with distributing a segmented HTTP stream.

DETAILED DESCRIPTION

There is a need for methods, systems, apparatus, means and computer program products to provide high availability manifests for HTTP video streams. In general, as used herein, the term "high availability" refers to a video stream which does not have a single point of delivery failure with respect to the delivery of the segmented media files associated with the stream.

According to some embodiments, systems, methods, apparatus, and computer program code are provided to process video source data to generate a high availability segmented video stream for delivery to client devices. Pursuant to some embodiments, the video source data is packaged into a first segmented video stream and a second segmented video stream, and a first stream manifest file for the first segmented video stream and a second stream manifest file for the second segmented video stream are generated. A high availability stream manifest file is generated based on the first stream manifest file, the second stream manifest file and information associated with the availability of individual segments of the first and second segmented video streams. The segmented video stream data is then provided via the high availability stream manifest file to one or more client devices over one or more network connections.

As used herein, the phrases "video feed" or "video stream" may refer to any signal conveying information about a moving or still image, including audio and ancillary signals and including a High Definition-Serial Data Interface ("HD-SDI") signal transmitted in accordance with the Society of Motion Picture and Television Engineers 292M standard. A "video feed" or "video stream" may also be or include data carrying an MPEG transport stream including compressed data via Asynchronous Serial Interface ("ASI") or the like. Although HD signals may be described in some examples presented herein, note that embodiments may be associated with any other type of video feed, including a standard broadcast feed or a three dimensional image feed. Moreover, video feeds or received images might comprise, for example, an HD-SDI signal exchanged through a fiber cable or a satellite transmission.

Those skilled in the art, upon reading the following disclosure, will appreciate that features of the present invention may be used with similar desirable results for audio data streams or any time dependent type of data as well.

Features of some embodiments will now be described by reference to FIG. 1 which is a block diagram of a system 100 for delivering video streams to one or more client devices. As shown, the system 100 includes a video source 102 which provides source video data for distribution to one or more client devices 108 pursuant to the present invention. Although a single video source 102 is shown, in many implementations, a plurality of different video sources 102 may be used in conjunction with the present invention. The video sources 102 may include, for example, one or more cameras, production or master control rooms, playback servers, and video routers. The video data produced by such video sources 102 is processed using one or more processing devices 104 which are configured to operate pursuant to the present invention. Features of a processing device 104 pursuant to one illustrative embodiment of the present invention will be described further below in conjunction with FIG. 3. The processing device 104 may be configured as a server receiving data from one or more video sources 102 and performing processing as described herein to produce a segmented series of media files that, when played in sequence, provide a streaming representation of the video data from the video sources 102. The processing device 104 may include (or be in communication with) a distribution system 106 which distributes the segmented video to one or more client devices 108.

For example, the distribution system 106 may include one or more standard web servers for delivering data streams and other files to the client devices. The distribution system 106 may be or include a content delivery network, an edge network, or the like. As will be described further below, the distribution system 106 delivers a series of media files and index files to the client devices 108 over HTTP connections. The client devices 108 may be any of a number of computing devices capable of receiving and displaying media information distributed by the distribution system 106 over the HTTP connections. For example, client devices 108 may include personal computers, handheld devices (such as mobile phones, iPads® or other tablet computers) Internet-connected televisions, or the like. Each of the client devices 108 operate client software (such as a Web Browser) to access and obtain data provided by the distribution system 106 (such as, for example, index files or stream manifest files based on a URL identifying a desired stream of media). The client devices 108 use information in the index files to identify the location of a series of media files in a stream and downloads each media file (or "chunk") in sequence. Once the client device 108 has obtained a sufficient amount of downloaded data, the client device 108 presents or displays the sequence of media files to a user of the client device 108. As the client device 108 fetches the sequence of media files, it periodically checks the stream manifest to obtain the correct sequence of files.

Features of some embodiments will be described by reference to FIG. 3, where a processing system 300 pursuant to some embodiments of the present invention is shown. The system may receive video (or other media) data from one or more video sources for processing pursuant to the present invention. For example, the system 300 may receive the video data at 302 and encode the received video stream using one or more video encoders 304, 314. The encoders 304, 314 may be any encoders which take a real-time or other input signal from one or more audio-video devices and encode the stream and encapsulate it for delivery. In some embodiments, the encoders 304, 314 may be encoders selected to encode the stream as an MPEG-2 transport stream. Those skilled in the art, upon reading the present disclosure, will appreciate that other encoding schemes and encoding devices may be used (however, for simplicity and ease of exposition, the use of an MPEG-2 transport stream will be described for illustrative purposes herein).

The encoders 304, 314 deliver the MPEG-2 transport stream to packagers 306, 316 that read the encoded transport streams and divide or package them into a series of smaller stream packages which are stored as media files on a disk 308, 318 or storage area associated with each packager 306, 316. For example, the packagers 306, 316 may be configured to segment the stream into a series of small media files (or "chunks") of substantially equal duration (e.g., such as 10 second chunks). Each smaller media file or segment is identified by a file name and is associated with an index file that is used to index or identify the set and sequence of chunks in the stream. The index is also used to track the availability and file location of each of the chunks. As described herein, each of the indexes generated by the packagers 306, 316 are referred to as "manifests". Each of the streams has its own stream manifest 310, 320 which is updated as the video source data is received and processed.

Any number of stream manifest formats may be used. For example, each of the stream manifests 310, 320 may include information identifying the segment (or "chunk") file location (e.g., which may be in a format such as http://url/segment_filename), as well as information identifying the segment length, information identifying the segments sequence number, and information specifying any encryption or other special formatting or processing required to play the segment. The manifest file may also specify any digital rights management controls associated with the stream. In some embodiments, each of the manifest files may be provided in a known format (e.g., such as an XML or other file type).

Each of the individual segment files produced by the packagers 306, 316 may be generated in a format such as the .ts file format (generated by MPEG-2 transport stream encoding). In the case where the media files being streamed are audio-only files, other formats may be used (for example, the files may be encoded using AAC audio or MP3 audio formats).

Pursuant to some embodiments, multiple stream manifests 310, 320 are generated for the same content. For example, as shown in FIG. 3, two stream manifests 310, 320 are generated based on the same video source data received at 302. Further, pursuant to some embodiments, an output of each packager 306, 316 is used to generate a high availability ("HA") manifest file 332. The HA manifest file 332 ensures that if content referenced by one of the stream manifests 310, 320 is not currently available, or if one of the stream manifests 310, 320 is not currently being updated, that a different manifest may be selected as the source manifest for delivery to users 340 operating client devices. Pursuant to some embodiments, a HA service 330 may be operated to manage the delivery of the appropriate stream manifest to users. The HA service 330 determines which of the chunks or items of content stored on disk 308, 318 are to be included in the HA manifest. As described further below, the HA service 330 may use a variety of different techniques to ensure that client devices receive uninterrupted content streams with seamless and continuous distribution.

Unlike existing methods of streaming video data, embodiments provide a high availability manifest which allows multiple manifests or indexes to be generated and maintained for the same content from multiple packaging and encoding systems. Unlike prior approaches, embodiments of the present invention provide a high availability manifest that is updated in real time. The high availability provides a better experience for a user during distribution chain failures (which may, for example, impact one of the streams). In some embodiments, as will be described further below, the user experience and delivery of seamless and uninterrupted streams can be further improved through use of one or more sub-chunking processes.

Figure 4:
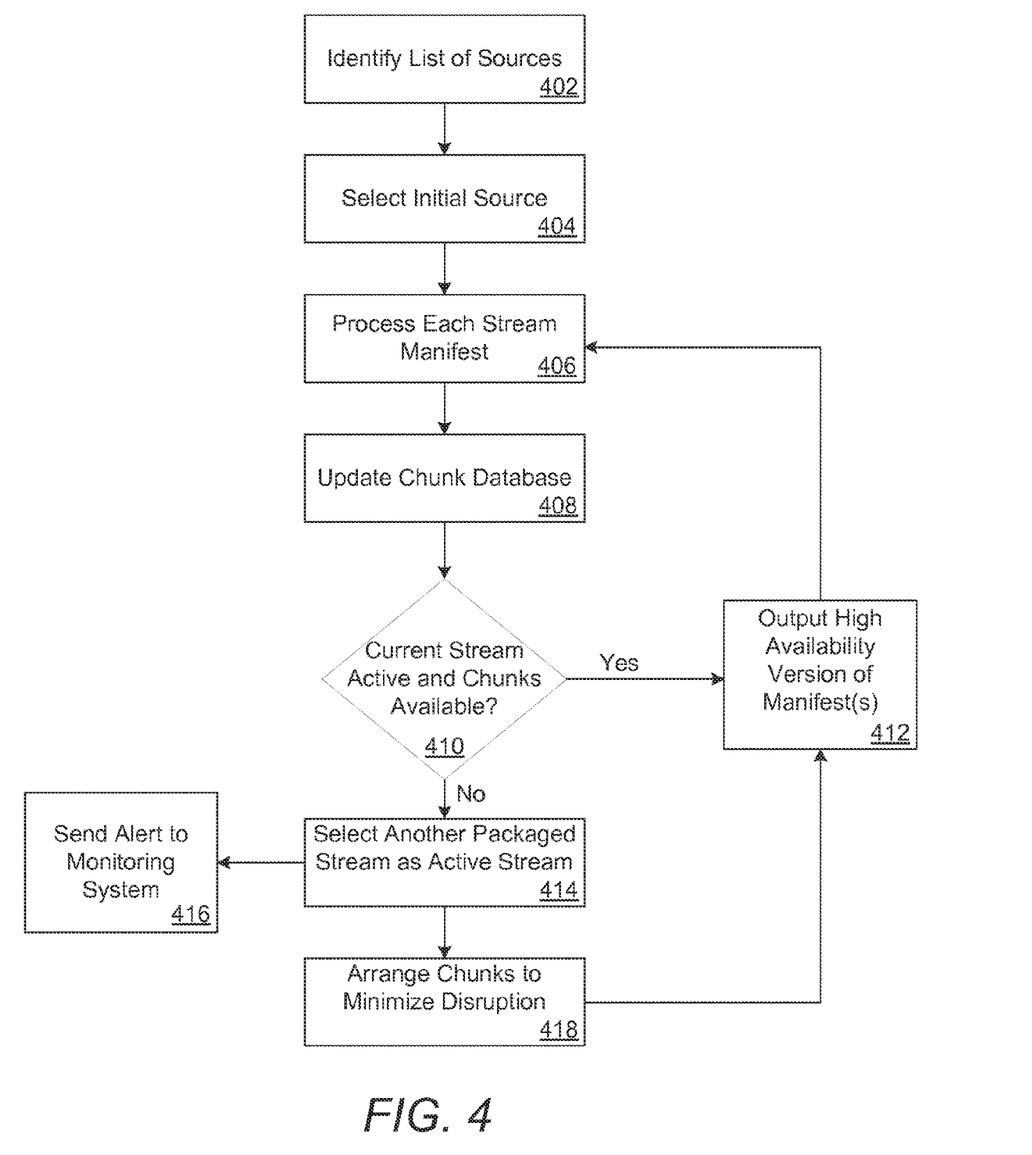
FIG. 4 is a flow chart of methods in accordance with some embodiments of the present invention.

FIG. 4 illustrates a process 400 that might be performed, for example, by some or all of the elements described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Figure 1:
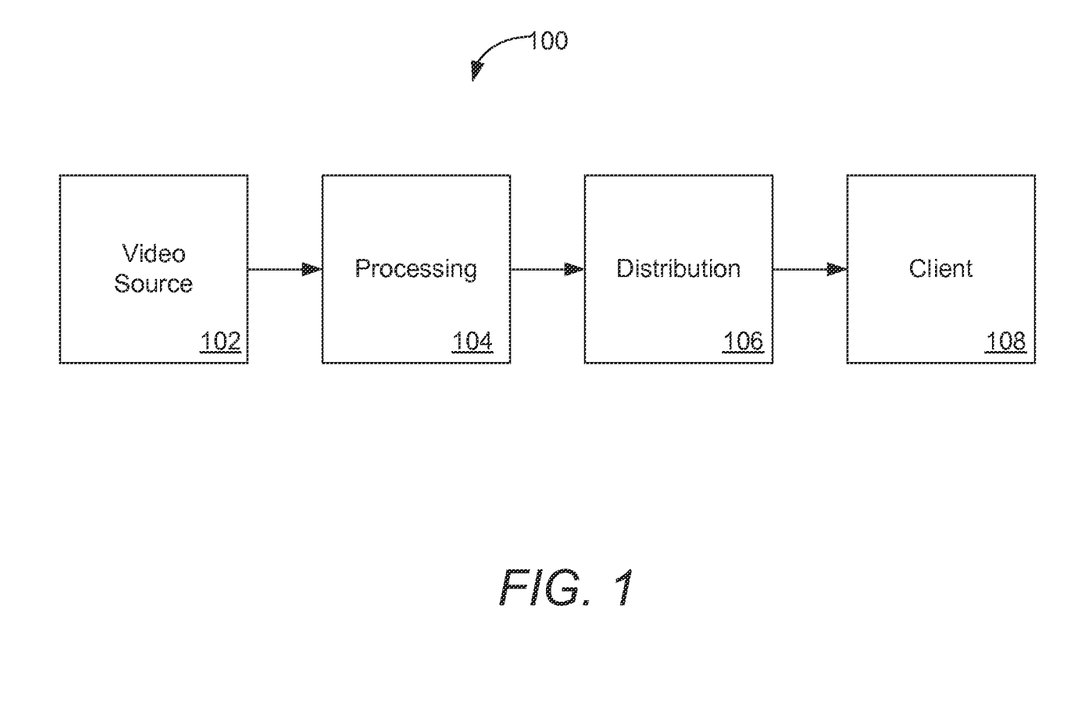
FIG. 1 is an illustration of a video streaming system pursuant to some embodiments.

The process 400 may, for example, be implemented by the processing system 104 of FIG. 1 using components such as those described above in conjunction with FIG. 3. The process 400 may be repeated for different events to be streamed to clients. For example, at any given time, multiple processes 400 may be conducted for different events being streamed to clients.

Process 400 begins at 402 where a list of source media streams is identified. For example, referring to the system 300 of FIG. 3, processing at 402 may include identifying two streams as sources: stream "A" (encoded by encoder A 304) and stream "B" (encoded by encoder B 314). Those skilled in the art, upon reading this disclosure, will appreciate that more than two sources may be identified (for example, three or more encoders and packagers may be deployed to generate more than two streams of media files). To illustrate the case where two sources of media streams are used in a system of the present invention, reference is now made to FIG. 5, where a simplified block diagram depicts two streams, a first stream 502 (which may be, for example, generated by a first encoder and packager) and a second stream 504 (which may be, for example, generated by a second encoder and packager).

Figure 5:
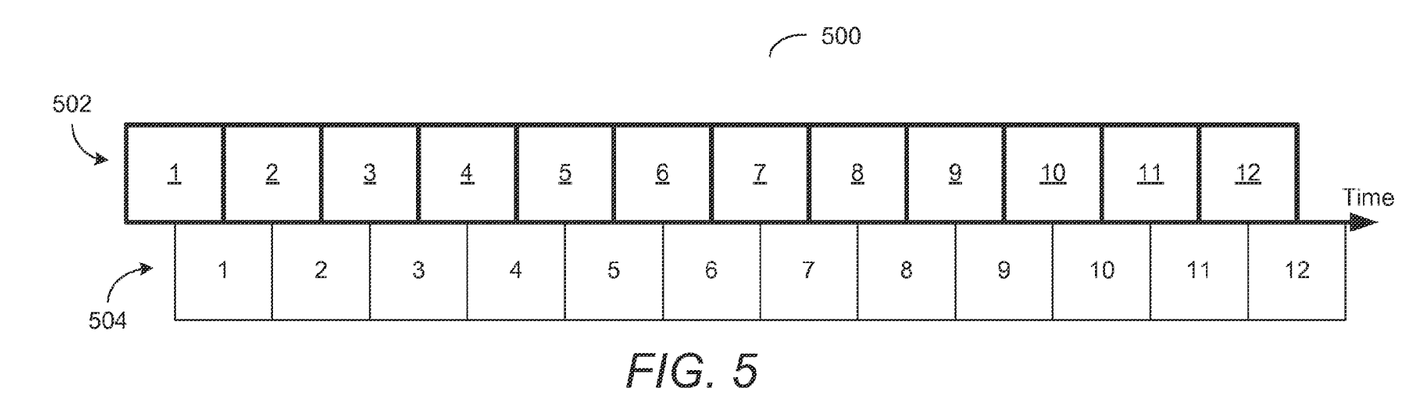
FIGS. 5-7 are block diagrams illustrating video streams provided in accordance with some embodiments.

Each stream 502, 504 includes a series of chunks or media files that, when played in sequence (where the sequence is identified as "1", "2", etc., where each individual chunk or media file is represented by a square, and where the active stream (i.e., the stream currently being received by the user) is bolded with an underlined chunk number such as "$\underline{1}$", "$\underline{2}$", etc.) enables a user operating a client device to watch a live video stream. As the video stream progresses over time, additional chunks are added to the stream.

In the embodiment depicted in FIG. 5, the two streams are generated based on the same source video data, but because they are encoded and packaged by different encoders and packagers, the two streams may be offset slightly one from the other. While the chunk boundaries may be in different locations, the content between the two streams is in synch.

Figure 3:
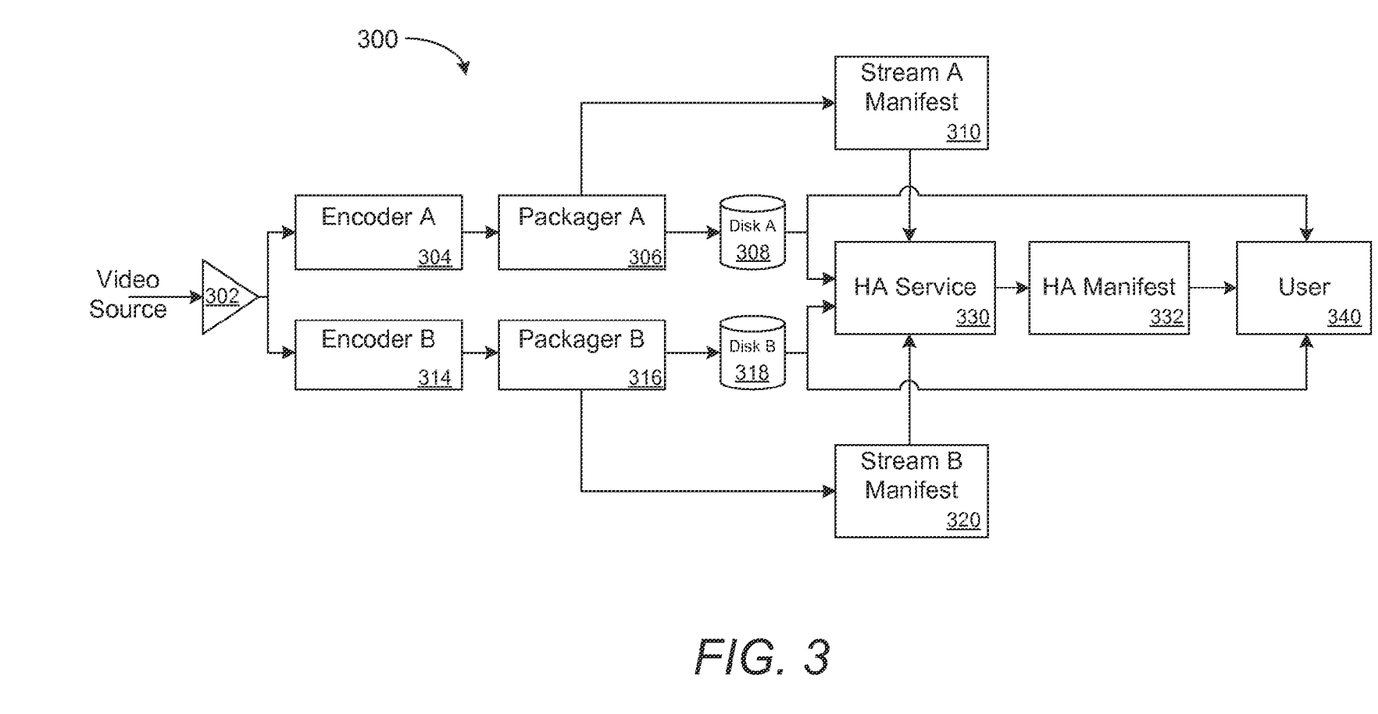
FIG. 3 is an illustration of a video streaming system in accordance with some embodiments.

As the streams 502, 504 are encoded and packaged (using encoders 304, 314 and packagers 306, 316, for example) a manifest or index file is generated and updated for each stream (shown as stream A manifest 310 and stream B manifest 320 in FIG. 3). For example, the stream A manifest 310 may include information identifying a file location for each of the chunks numbered "1", "2", etc. and may also specify the sequencing of those files. Processing continues at 406 where each of the stream manifests is processed to identify the file locations and sequencing of each of the streams 502, 504.

Processing continues at 408 where a chunk database associated with the HA service 330 is updated. The chunk database may be a file or storage location which identifies the location, duration, and sequencing of each of the chunks in each of the streams 502, 504. Processing continues at 410 where the HA service 330 determines whether the current stream (identified at 404) is active and whether the chunks associated with the stream are available. For example, if stream 502 was selected as the initial source (as indicated in FIG. 5 by the fact that the chunks in stream 502 are highlighted with underlined numbers "$\underline{1}$", "$\underline{2}$", etc. and their boundaries are bolded), processing at 410 includes determining, for each client request, whether the chunks in the active stream 502 are available. In the illustrated example of FIG. 5, all of the chunks 1-12 are available in stream 502, so processing at 410 results in a "yes" or "true" and processing continues at 412 where the HA service 330 outputs the high availability version of the manifest (item 332 of FIG. 3), and the HA version of the manifest controls the sequencing and indexing of files to be delivered to the user 340. In some embodiments, the HA version of the manifest need not be generated—instead, it may remain in system memory to be accessed when needed (e.g., on demand).

If processing at 410 indicates that the current stream is not active or that not all of the chunks 1-12 are available, processing continues at 414 where another packaged stream is selected as the active stream (at substantially the same time, in some embodiments, an alert or notification message may be transmitted at 416 to a monitoring system to alert the system or an operator that an issue need resolution). An example of an illustrative scenario in which processing may continue at 414 is shown by reference to FIG. 6A where two streams 602, 604 are depicted. Stream 602 was initially selected as the current stream, and was active through chunks $\underline{1}$-$\underline{6}$. However, chunk 7 is not available (illustrated by the "X" marked on chunk 7 of stream 602). The corresponding chunk 7 of stream 604 is, however, available. Pursuant to some embodiments, processing at 414 includes selecting the alternative stream (in this example, stream 604) as the new active stream. In particular, in the illustrative example of FIG. 6A, the chunks are streamed as follows: stream 602 chunk $\underline{1}$-stream 602 chunk $\underline{6}$, stream 604 chunk $\underline{7}$-stream 604 chunk $\underline{12}$, etc. In this manner, embodiments ensure a high availability and the streaming of chunks to a client is not significantly affected by an outage or availability issue that affects one of the streams.

Figure 6A:
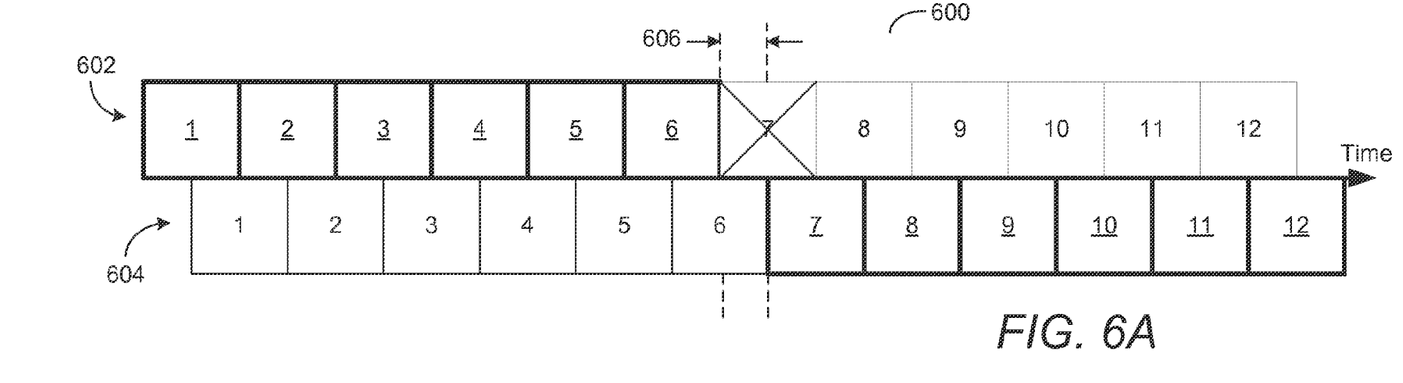
Figure 6B:
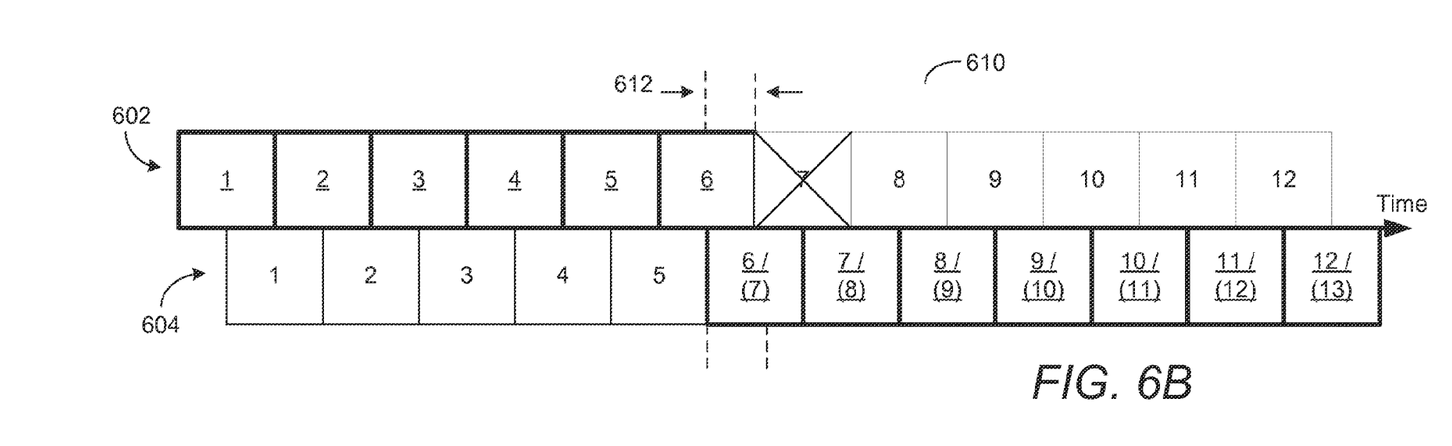

In some embodiments, to avoid disruptions or lags due to a gap between chunks in a sequence (associated with a gap of missing content between the chunks of the source streams, which is illustrated in FIG. 6A as item 606), processing may continue at 418 where the chunks are arranged to minimize disruption in the streaming of the chunks to the client. A number of different approaches may be used to arrange the chunks to minimize disruption. For example, in one embodiment, illustrated in FIG. 6B, if the chunk boundaries do not perfectly align between packaged streams, a replacement chunk may be selected so that content is not missed. For example, in FIG. 6A, during the period 606, there is a gap in content. In FIG. 6B, as play moves from stream 602 to new active stream 604, instead of a gap in content, content is repeated at 612. As shown, since stream 602 was disrupted at chunk "$\underline{6}$", the new active stream 604 starts at chunk "$\underline{6}$" ensuring that content is not skipped. In FIG. 6B, the new reference chunk numbers are depicted with a parenthesis around them.

In some embodiments a replacement chunk may be generated in stream 604 (selected as the new active stream). The replacement chunk is generated based on the size of the gap or delay and is a combination of original chunks 6 and 7 and sized to eliminate the timing gap. The subsequent chunks in the sequence of stream 604 are generated in a similar manner to ensure that the user has a substantially seamless viewing experience. The modified chunks $\underline{6}$/$\underline{7}$, etc., can be generated using any of a number of well-known video processing and clipping techniques.

Figure 7:
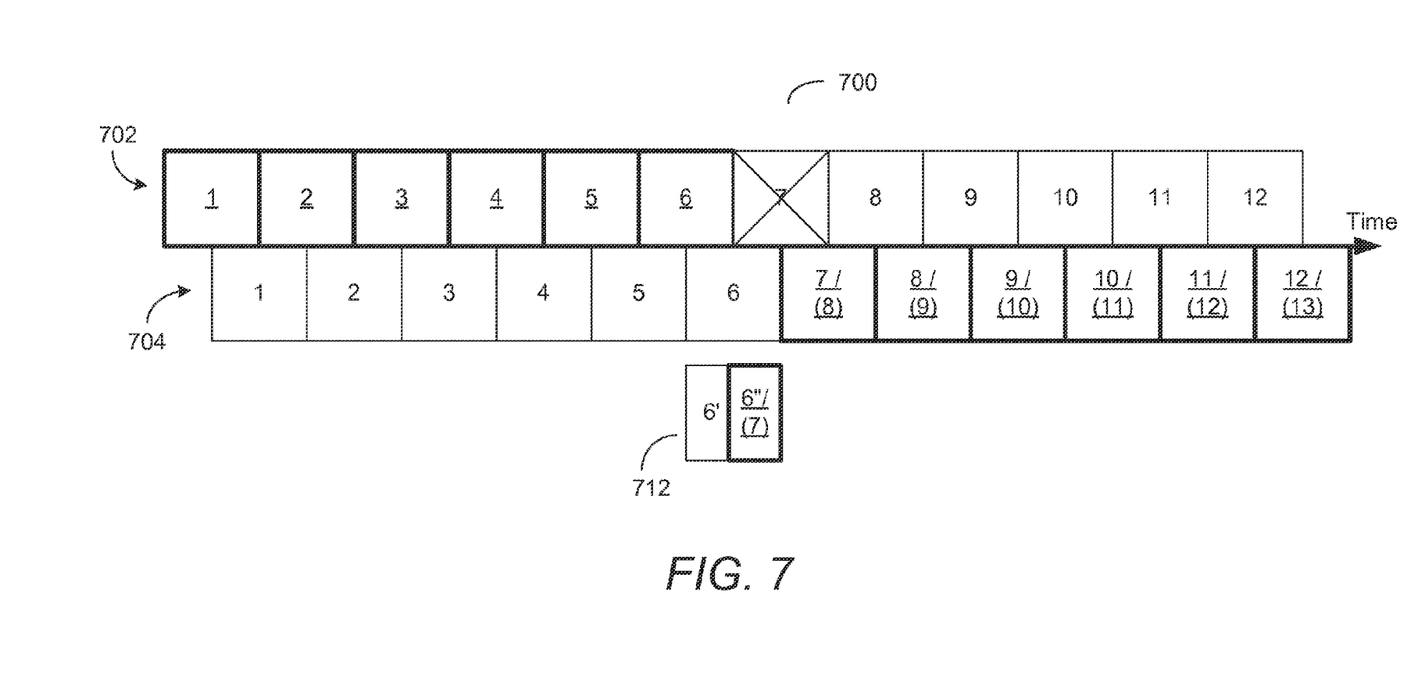

In another illustrative embodiment of processing performed at 418, illustrated in FIG. 7, a replacement chunk may be generated to fill the gap. As illustrated in FIG. 7, a first active stream 702 has a chunk 7 that is unavailable, and processing pursuant to the present invention switches the active stream to stream 704. However, due to latency or delay between the two streams 702, 704, a gap between chunk 6 of stream 702 and chunk 7 of stream 704 exists. To fill the gap and to provide a more seamless viewing experience, processing at 418 generates a new chunk shown as item 712. The new chunk is a combination of the second half (e.g., the last 5 seconds or so) of chunk 6 (shown as subchunk $\underline{6}$") and the first half of chunk 7 (shown as subchunk ($\underline{7}$), item 712). The remaining chunks in the stream 704 are similarly combined to provide a seamless viewing experience to a user. Again, any of a number of well-known video processing and clipping techniques may be used to generate the sub chunks and combinations, such as, for example, the open source ffmpeg tool.

In general, each chunk or manifest file contains timing information such that the exact time represented by each chunk is known to the system. By using such timing information, a series of determinations regarding how to replace a missing chunk may be made. First, if a determination is made that a chunk is missing or unavailable, a check can be made to determine if an alternative stream with an aligned chunk is available. If so, that alternative stream and aligned chunk may be used. If not, a further determination may be made whether an alternative stream with a future chunk is available (e.g., missing some content less than some configurable amount). If so, that future chunk may be used. If not, a further determination may be made whether an alternative stream with repeated content is available. If so, that repeated content may be used. In this manner, multiple replacement options may be attempted in order to replace a missing chunk of content, reducing or substantially eliminating disruptions in viewing a stream of content.

The result is a process that allows the creation and delivery of a high availability segmented video stream. The process can run in a clustered configuration so that it is resilient to hardware issues. Further the process can store its state in a persistent fashion, allowing it to be restarted or migrated with little to no impact on users viewing the segmented video stream over HTTP connections.

The processing system 104 of FIG. 1 may be implemented in a number of ways. As a simple illustrative but not limiting example, the processing system 104 may be implemented as a server (or servers) based on one or more INTEL® Pentium® processors, coupled to communication devices configured to communicate with remote devices, for example, to receive a video feed and to output the segmented video feed and manifests.

A number of embodiments of the invention are disclosed herein. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although several illustrative chunking and sub-chunking methods have been described, other combinations of chunks may be used to reduce skipping or other issues in the stream delivered to a client. Moreover, although specific hardware and data configurations have been described herein, note that any number of other configurations may be provided in accordance with embodiments of the present invention. Further note that embodiments may be associated with any number of different types of broadcast, video, or audio programs.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:
   receiving, at a processing system, video source data;
   packaging the video source data into a first segmented video stream and a second segmented video stream;
   generating a first stream manifest file for the first segmented video stream and a second stream manifest file for the second segmented video stream;
   identifying one of the first and second segmented video streams as the currently active one of the streams, wherein the currently active stream is the stream currently being received by a user;
   generating a high availability stream manifest file based on the first stream manifest file, the second stream manifest file and information associated with the availability of individual segments of the first and second segmented video streams; and
   providing the high availability stream manifest file to a client device over a network connection.

2. The method of claim 1, wherein the high availability stream manifest file includes information identifying a sequence of segments.

3. The method of claim 2, wherein the high availability stream manifest file further includes information identifying a file location of a media file associated with each of the individual segments.

4. The method of claim 3, further comprising:
   providing the media files associated with each of the individual segments to the client device over the network connection based on information in the high availability stream manifest file.

5. The method of claim 1, further comprising:
   determining that a media file associated with at least one individual segment in the currently active one of the streams is unavailable and switching the currently active one of the streams to another available stream.

6. The method of claim 5, further comprising:
   causing an alert to be transmitted to a monitoring system providing information about the at least one individual segment that is unavailable.

7. The method of claim 5, further comprising:
   arranging the media files associated with the individual segments in the currently active one of the streams to compensate for any gap.

8. The method of claim 7, wherein the arranging the individual segments further comprises:
   selecting a duplicate media file in the currently active one of the streams.

9. The method of claim 7, wherein the arranging the individual segments further comprises:
   selecting a new media file that fills the gap.

10. The method of claim 1, wherein the packaging the video source data further comprises packaging the video source data into at least a third segmented video stream and generating a third stream manifest file for the third segmented video stream, wherein the high availability stream manifest file is further generated based on the third stream manifest file and information associated with the availability of individual segments of the third segmented video stream.

11. A system, comprising:
    a processing device to receive a video program and to package the video program into a first segmented video stream and a second segmented video stream, the first segmented video stream associated with a first stream manifest file and the second segmented video stream associated with a second stream manifest file, wherein the processing device is further configured to identify one of the first and second segmented video streams as the currently active one of the streams, wherein the currently active stream is the stream currently being received by a user;
    a storage device for storing the first segmented video stream and the second segmented video stream; and
    a high availability stream manifest file generated based on individual stored segments in the first segmented video stream and the second segmented video stream.

12. The system of claim 11, further comprising:
    a distribution device in communication with the processing device and configured to receive a request for data associated with the video program based on information in the high availability stream manifest file.

13. The system of claim 12, further comprising:
    a client device in communication with the distribution device over a network, the client device generating the request for data and receiving data associated with the video program.

14. The system of claim 11, wherein the individual segments in the first segmented video stream and the second segmented video stream are media files, wherein the media files are stored in locations and in a sequence identified by the high availability stream manifest file.

15. The system of claim 11, wherein the processing device is further configured to generate a first stream manifest file for the first segmented video stream and a second stream manifest file for the second segmented video stream.

16. The system of claim 15, wherein the high availability stream manifest file is generated based on the first stream manifest file and the second stream manifest file.

17. The system of claim 11, wherein the processing device is further configured to determine that a media file associated with at least one individual segment in the currently active one of the segmented video streams is unavailable and switching the currently active one of the segmented video streams to another one of the segmented video streams.

18. The system of claim 17, wherein the processing device is further configured to generate a replacement media file to compensate for a gap in segments upon switching the currently active one of the segmented video streams to another one of the segmented video streams.

19. A non-transitory, computer-readable medium storing instructions adapted to be executed by a processor to perform a method, the method comprising:

packaging video source data into a first segmented video stream and a second segmented video stream;

generating a first stream manifest file for the first segmented video stream and a second stream manifest file for the second segmented video stream;

identifying one of the first and second segmented video streams as the currently active one of the streams, wherein the currently active stream is the stream currently being received by a user;

generating a high availability stream manifest file based on the first stream manifest file, the second stream manifest file and information associated with the availability of individual segments of the first and second segmented video streams; and providing the high availability stream manifest file to a client device over a network connection.

20. The medium of claim 19, wherein the method further comprises:

determining that a media file associated with at least one individual segment in the currently active one of the streams is unavailable and switching the currently active one of the streams to another available stream.

\* \* \* \* \*